Feb. 22, 1955
R. N. YOUGER
2,702,892
ELECTRICAL TEST PROBE
Filed Feb. 2, 1951
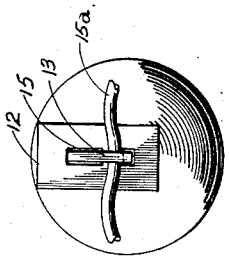
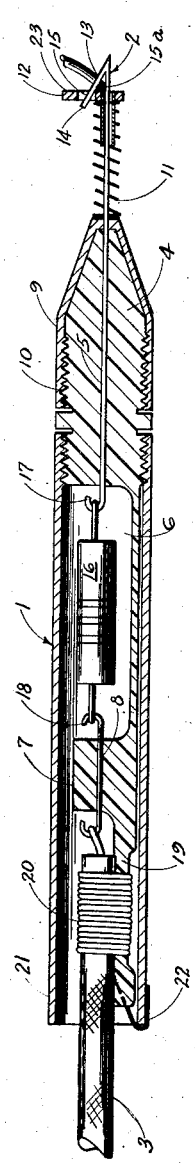
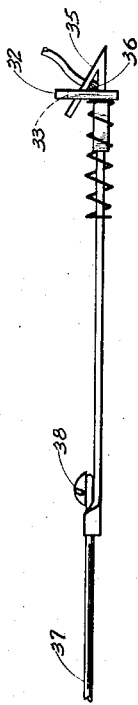
INVENTOR.
ROBERT N. YOUGER
BY
*Warren Kunz*
AGENT United States Patent Office 2,702,892
Patented Feb. 22, 1955

2,702,892

ELECTRICAL TEST PROBE

Robert Nelson Youger, Covington, Ky.

Application February 2, 1951, Serial No. 209,098

3 Claims. (Cl. 339—108)

The present invention relates to electrical test instruments and more particularly to a test probe for checking electrical circuits.

It is commonplace today in the electronics field to utilize various types of electrical test probes for checking electrical circuits. Checking such circuits often involves short-circuiting portions of the circuit under test and in certain instances requires the determination of particular voltage variations or wave forms at specific points in the circuit. It has been found convenient to use test probes of the type disclosed herein for this purpose.

The present invention comprehends the provision of an easily manipulated probe which can be momentarily touched to a predetermined point of the circuit wiring or which may be temporarily secured to the test point if desired. Briefly stated, the probe includes an insulated handle portion for manipulation by one hand of the user. To the insulated portion is attached an elongated metallic projection or prod which either may be touched to or may be temporarily secured to the point in the circuit to be shorted or tested. The prod is formed to define a hook at its projecting end in cooperative disposition to a foot slidably retained on the elongated shank of the prod. A compression coil spring is disposed between the handle portion and the slidable foot and acts to force the foot against the prod hook in wire-engaging relationship with the portion of the circuit unders test. It is also within the purview of the present invention to provide as a component of the body portion an adjusting cap for biasing the spring and regulating the amount of load which it exerts on the slidable foot whereby the pressure between the hook, foot and test wire may be regulated at will.

In view of the foregoing, it is an object of the present invention to provide a test probe which may be easily manipulated by one hand of the user either for momentarily touching a part of a test circuit or for temporary attachment thereto.

Another object of the invention is the provision in a test probe of an adjusting cap for regulating the gripping force exerted by the test probe on a test wire to which it is temporarily attached.

A particular object of the present invention is the provision of a movable foot on a prod projecting from the test probe handle, the foot being non-rotatably but slidably secured to the prod.

Another advantage of the present invention is the provision of a probe to which may be permanently secured a lead wire so as to prevent failure of the wire at its point of attachment.

Another advantage of the present invention is the provision of an improved construction whereby a resistance may be placed in series between the prod of the test probe and its lead wire. The structure taught by the present invention completely protects the resistance from damage.

A particular advantage of the present invention is the provision of a test probe which may be easily manipulated without the use of the fingers for temporary attachment to a particular point on a wire in an electrical circuit under test.

A still further advantage of the present invention is its organization of elements whereby the probe may be removably locked in engagement with the predetermined point of the test circuit.

Another object of the present invention is the provision of a test probe which is not only simple and effective in use but economical to manufacture.

Other objects and advantages of the present invention will become apparent in the course of the following description of a preferred embodiment and its manner of operation when read with reference to the attached drawing, in which:

Fig. 1 shows a longitudinal sectional view of a completely assembled test probe made according to the teaching of the present invention;

Fig. 2 is an end elevational view of the test probe in temporary engagement with a wire of a circuit under test;

Fig. 3 is a plan view of a modified form of a simplified version of the probe in engagement with a test wire; and Fig. 4 is a side elevational view of the simplified version shown in Fig. 3.

With particular reference to Fig. 1, it will be noted that the preferred embodiment includes a handle or body portion, generally designated 1, to which is secured a projecting prod, generally designated 2, which is in electrical circuit with a test lead or wire 3. The handle of the test probe comprises a core 4 made from Bakelite or other electrical insulating material. The prod 2 may be integrally molded within core 4, as at 5, and extends into a cavity 6 formed within core 4. The core also includes a raised boss 7 in which is integrally molded an electrical connecting link 8.

An adjusting cap 9 is threadedly secured to core 4, as at 10, and may be axially adjusted relative to the core so as to bias a compression coil spring 11 which surrounds prod 2 in concentric relationship. The projecting end of spring 11 bears against a foot 12 which is slidably retained on prod 2, the spring acting at all times to urge the foot toward the right hand (as viewed in Fig. 1) end of the prod.

An important feature of the present invention is the formation of prod 2 with a square or other non-circular cross section as indicated in Fig. 2. This cross sectional configuration of the prod cooperates with the interior of foot 12 to prevent its relative rotation while permitting sliding movement along the prod. The prod is also formed to define a hook 13 at its projecting end, the hook including an inturned portion 14 which loosely passes through a hole 15 formed within foot 12. As indicated in Figs. 1 and 2, a length of test wire, such as 15a, may be temporarily locked in engagement with hook 13 by foot 12 under the force imposed thereon by spring 11. Such a temporary locking engagement is highly useful when a portion of the test circuit must be shorted or otherwise electrically tapped into for a protracted time period.

Frequently it is necessary to place a resistance in series with a test probe for particular types of test. The preferred embodiment of the present invention facilitates the inclusion of such a resistance, as at 16, which may be placed electrically in circuit with the test probe by soldered or other suitable connections 17 and 18. A particular benefit of the construction disclosed is that the resistance 16 is mechanically isolated from the test lead 3 so that extraneous forces imposed on the test lead cannot effect the resistance or damage it in any way. Protection from physical injury is assured in the preferred embodiment through the provision of the fixedly mounted electrical connecting link 8 to which the lead wire is connected. In other words, the resistance is mechanically isolated from the test lead.

A common difficulty encountered with prior art test probes is the dislocation and failure of the test lead at its point of connection with the test probe proper. This difficulty has been overcome in the present invention by the provision of an elongated necked portion 19 formed integrally with core 4. As indicated in Fig. 1, test lead 3 may be bound to section 19 with twine or light wire as at 20 thus preventing the lead wire from being torn loose from the test probe while in use.

The electrical connections of the lead wire, resistance and prod are completely shielded by sheath 21 which may be made from Bakelite, steel or any other desirable material. This sheath not only protects the electrical connections within the probe but also comprises a handle portion which may be grasped by the user.

For certain particular operations it is necessary to use a shielded lead wire 3 having a metallic outer jacket. When such a lead wire is employed, it is desirable to electrically connect the sheath 21 to the shielding of the cable. This may be accomplished in the present invention by the utilization of a metallic sheath 21 to which the shielding of the lead wire can be electrically connected by soldering or other suitable means as indicated at 22.

The probe shown in Fig. 1 can be used in several ways. For momentarily shorting a part of a test circuit, the user, holding the probe in one hand by the handle, may touch the projecting end of hook 13 to any predetermined part of the circuit, thereby shorting or introducing into the circuit or abstracting from the circuit any desired wave form or voltage pattern. Such a use is common for this general class of test probe. In fact, most test probes can only be used in this fashion. It is important to note, however, that the preferred embodiment can be utilized in several other ways which are highly desirable and completely unattainable by test probes previously employed in the electronics field.

A novel use to which the probe may be put is in the temporary engagement with a wire in the test circuit. When used in this fashion, the test probe is grasped by one hand of the user and face 23 of foot 12 is pushed against the wire with a force sufficient to compress spring 11 and to slide the foot along prod 2 toward handle 1. When face 23 has moved sufficiently to expose end 14 of the prod hook, the test wire 15a may be slipped underneath the hook and the force compressing the spring may be relieved permitting the foot to move outwardly along the prod until the test wire is trapped between face 23 and the hook. When the wire is so engaged, end 14 of the hook passes through opening 15 in foot 12 and physically prevents disengagement of the test probe.

Should it be desirable to hold the test wire in particularly tight engagement, adjusting cap 9 may be screwed outwardly along core 4 to increase the total compression load of spring 11. In this way the test wire can be subjected to an extremely tight gripping force.

Occasionally it is desirable to hook a test probe to a predetermined part of a circuit for an extended time period. During such use it is important that the test probe remain tightly engaged so as not to become disconnected through any inadvertent movement of the test lead connected thereto. For such purposes, the test wire may be hooked or engaged as previously described and the adjusting cap 9 may be screwed outwardly to an extreme position with spring 11 solidly compressed against foot 12. When the adjusting cap is so positioned, all movement of the foot is precluded and the test wire is held tightly engaged.

A particularly important feature of the present invention is the non-rotatability of foot 12 on prod 2. Since the foot cannot rotate on the prod, temporary engagement of the test probe with a test wire is greatly facilitated since the user only has to use one hand to force the foot against the test wire and to snap it into locked engagement as illustrated in Fig. 1. When an attempt is made to use prior art structures in such a fashion, considerable difficulty is encountered because the foot or its equivalent tends to rotate on the prod and the user must handle the probe with extreme delicacy if the desired connection is made. It is noteworthy that no manipulation of the fingers is required as when prior art probes are used.

A modified form of the subject invention is shown in Figs. 3 and 4. The form of test probe illustrated in these figures is designed principally for temporary attachment to a test wire and may be considerably simplified since such probes normally are attached before the circuit is energized when no danger of shock is present.

The modified form consists of a rectangular stamped metallic portion 30 from which projects an integrally formed prod 31 of rectangular or other non-circular cross section. A foot 32 having an opening 33 is slidably disposed on prod 31 in a fashion comparable to that illustrated in Fig. 1. A spring 34 is disposed between portion 30 and foot 32 and constantly biases the foot toward hooked portion 35 of the prod to facilitate temporary locked engagement with a test wire 36. The test lead 37, which in this case may be simply a piece of bare wire, may be attached to portion 30 by a screw 38 or other suitable electrical connecting means.

A test prod made as shown in Figs. 3 and 4 may be used in much the same fashion as that shown in Fig. 1. However, it is contemplated that its most common use will be when temporarily engaged with a test wire as illustrated in Figs. 3 and 4.

It is again to be noted that a salient feature of the embodiment shown in Figs. 3 and 4 is the fact that foot 32 is non-rotatably engaged for sliding movement on prod 31.

Having described a preferred embodiment of my invention, I claim:

1. An electrical test probe comprising a generally tubular body provided with an opening at each end thereof, an insulated electric conductor extending into one end of said body, means positioned at the other end of said body for attaching said probe to a wire conductor, and connector means for maintaining a constant conducting electrical connection between said conductor and said attaching means, said attaching means including a conductive shaft extending axially of said body from said connector means to a point spaced from the end of said body, said shaft terminating in a return bend to serve as a jaw seat for the wire, said shaft and return bend being fixed relative to said body, a foot slidably mounted on said shaft to serve as a jaw closure, a spring normally urging said foot toward the spaced end of said shaft, said foot being non-rotatably mounted on the shaft and provided with a recess for the return bend of the shaft to hold the wire in the jaw seat, whereby upon forcing the attaching end of the probe downwardly against a wire to be attached said foot moves axially on said shaft from the return bend towards the body to permit the wire to go into the jaw seat and release of the downward force permits the foot to lock the wire in the jaw seat.

2. An electrical test probe comprising a generally tubular body provided with an opening at one end thereof, means positioned at said end of said body for attaching said probe to a wire conductor, and connector means for making electrically conducting connection with said attaching means, said attaching means including a conductive shaft extending axially through the opening of said body from said connector means to a point spaced from the end of said body, said shaft terminating in a return bend to serve as a jaw seat for the wire, said shaft and return bend being fixed relative to said body, a foot slidably mounted on said shaft to serve as a jaw closure, a spring normally urging said foot toward the spaced end of said shaft, said foot being non-rotatably mounted on the shaft and provided with a recess for the return bend of the shaft to hold the wire in the jaw seat, whereby upon forcing the attaching end of the probe downwardly against a wire to be engaged said foot moves axially on said shaft from said return bend towards said body to permit the wire to go into the jaw seat and release of the downward force permits said foot to lock the wire in the jaw seat.

3. An electrical test probe comprising an elongated body, means positioned at one end of said body for attaching said probe to a wire conductor, said attaching means including a conductive shaft extending axially of said body to a point spaced therefrom, said shaft terminating in a return bend to serve as a jaw seat for the wire, said shaft and return bend being fixed relative to said body, a foot slidably mounted on said shaft to serve as a jaw closure, a spring normally urging said foot toward the spaced end of said shaft, said foot being non-rotatably mounted on the shaft and provided with a recess for the return bend of the shaft to hold the wire in the jaw seat, whereby upon forcing the attaching end of the probe downwardly against a wire to be engaged said foot moves axially on said shaft from said return bend towards said body to permit the wire to go into the jaw seat and release of the downward force permits said foot to lock the wire in the jaw seat.

References Cited in the file of this patent

UNITED STATES PATENTS

| Number | Name | Date |
| --- | --- | --- |
| 871,352 | Martin | Nov. 19, 1907 |
| 1,241,627 | Hadfield | Oct. 2, 1917 |
| 1,352,092 | Sherman | Sept. 7, 1920 |
| 2,074,324 | Brown | Mar. 23, 1937 |
| 2,149,760 | Carlson | Mar. 7, 1939 |
| 2,249,153 | Martin | July 15, 1941 |
| 2,438,350 | Reichard | Mar. 23, 1948 |
| 2,516,657 | Spendlove | July 25, 1950 |
| 2,529,270 | Webster | Nov. 7, 1950 |
| 2,530,299 | Hendley | Nov. 14, 1950 |